March 3, 1964   F. J. BUDRONI   3,123,061
FUEL INJECTION APPARATUS
Filed Jan. 19, 1962
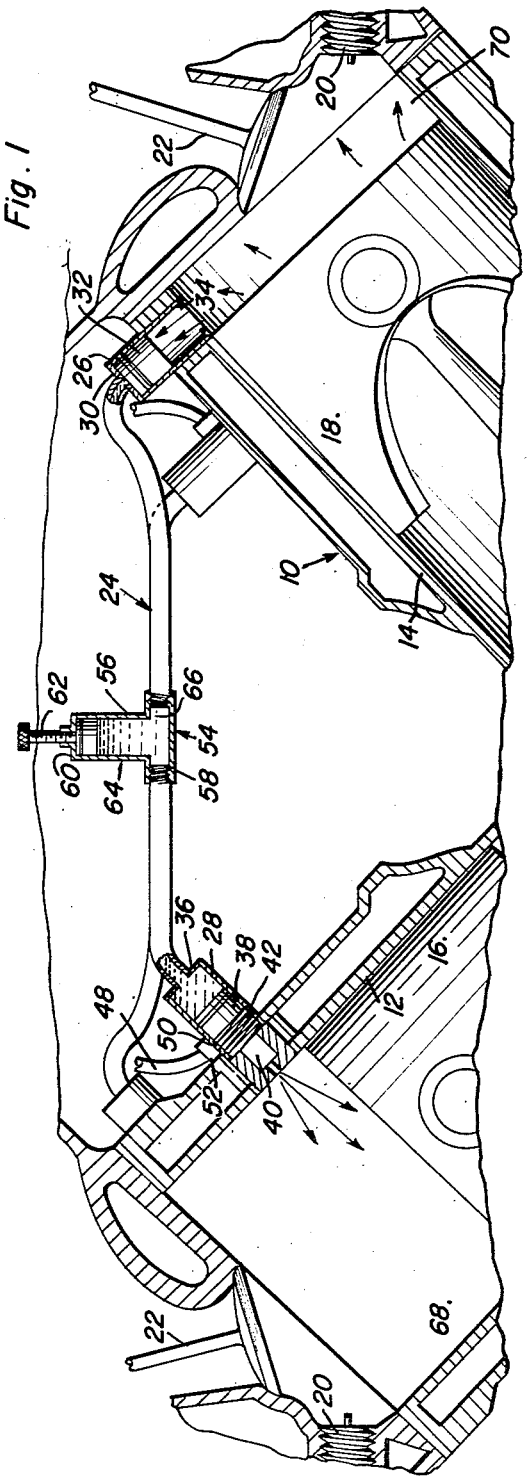
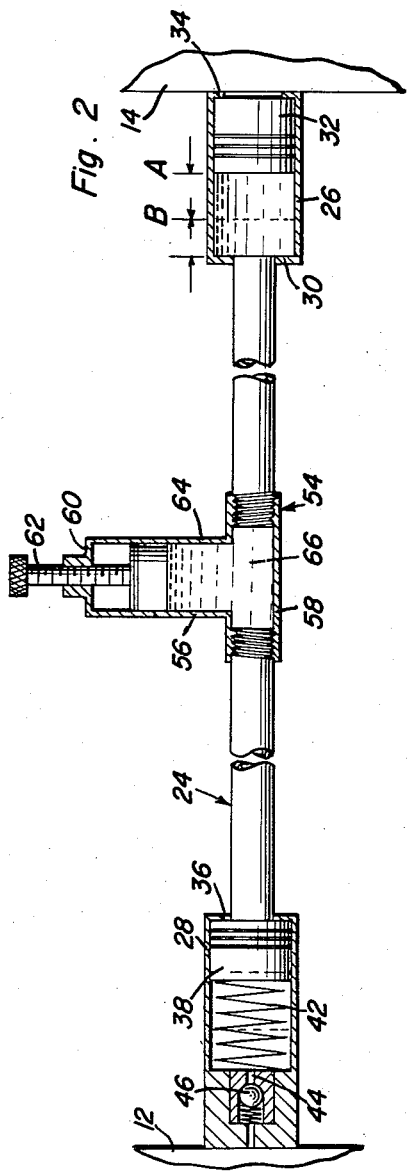
Frank J. Budroni
INVENTOR.

United States Patent Office 3,123,061
Patented Mar. 3, 1964

3,123,061
FUEL INJECTION APPARATUS
Frank J. Budroni, 4853 Umbria St., Philadelphia 27, Pa.
Filed Jan. 19, 1962, Ser. No. 167,247
4 Claims. (Cl. 123—139)

This invention relates to a novel and useful fuel injection method and apparatus for injecting measured quantities of liquid fuel into one or more combustion chambers of an internal combustion engine in timed sequence with the operation of the internal combustion engine.

While the fuel injection method and apparatus illustrated and described herein has been primarily designed as a means for injecting fuel into the combustion chambers of internal combustion engines, it is to be understood that the present invention resides in a novel motion transmitting fluid system which may be used advantageously in other environments.

The main object of this invention is to provide a means whereby liquid fuel may be injected into one or more combustion chambers of an internal combustion engine in timed sequence with the operation of the internal combustion engine and with the exact amount of fuel desired being injected each time the apparatus is actuated.

A further object of this invention, in accordance with the immediately preceding object, is to provide a fuel injection method and apparatus including improved and simplified means whereby the amount of fuel intermittently injected thereby may be accurately adjusted.

A still further object of this invention is to provide a fuel injection method and apparatus including pump means for injecting liquid fuel into a combustion chamber of an internal combustion engine operable directly from the pressure in another combustion chamber of the internal combustion engine during the power stroke operation of the combustion chamber.

A final object to be specifically enumerated herein is to provide a fuel injection apparatus in accordance with the preceding objects which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

FIGURE 1 is a fragmentary sectional view taken through a portion of a V-type reciprocating piston internal combustion engine shown with the fuel injection apparatus of the instant invention operatively associated therewith, parts of the fuel injection apparatus being broken away and shown in section; and FIGURE 2 is an enlarged fragmentary sectional view of the fuel injection apparatus with parts thereof being broken away.

Referring now more specifically to the drawings the numeral 10 generally designates an internal combustion engine of the V-type which includes at least two cylinders 12 and 14 in which pistons 16 and 18 are reciprocal. Each of the cylinders 12 and 14 includes ignition means 20 and air intake means 22 which are each operable in timed sequence with the reciprocation of the pistons 16 and 18. It is to be noted that the cylinders 12 and 14 each also include valve controlled exhaust outlet means (not shown).

A conduit generally referred to by the reference numeral 24 is provided and has a pair of pressure chamber means 26 and 28 on opposite ends thereof. Each of the pressure chambers 26 and 28 comprises a cylinder. The end of the cylinder 26 adjacent the conduit 24 is provided with an apertured end wall 30 through which the adjacent end of the conduit 24 opens and has a piston 32 slidably disposed therein. The end of the cylinder 26 remote from the conduit 24 opens through the wall of the cylinder 14 adjacent its upper end and is provided with abutment means 34 which prevent movement of the piston 32 into the cylinder 14.

The cylinder 28 includes an apertured end wall 36 through which the adjacent end of the conduit 24 opens and has a piston 38 disposed therein. The end of the cylinder 28, on the side of the piston 38 remote from the apertured end wall 36, defines a pumping chamber and includes a check valve assembly 40 and a compression spring 42 is disposed between the confronting surfaces of the check valve assembly 40 and the piston 38. The check valve assembly 40 defines a passage 44 which communicates the interior of the cylinder 12 with the interior of the cylinder 28 and has a spring-urged check valve 46 operatively associated therewith which prevents the flow of fluids from the cylinder 12 back into the cylinder 28.

A fuel line 48 has its outlet end communicated with the interior of the cylinder 28 as at 50 and has a check valve 52 of any desired type disposed therein for preventing the passage of fluids from the cylinder 28 into the fuel line 48. The apertured end walls 30 and 36 constitute limit stops for movement of the pistons 32 and 38 toward the remote ends of the conduit 24 and the abutment means 34 and the check valve assembly 40 comprise limit stops for movement of the pistons 32 and 38 away from the adjacent ends of the conduit 24.

A T-fitting generally referred to by the reference numeral 54 is provided and is disposed in the conduit 24. One leg 56 of the T-fitting comprises a cylinder and the end of the leg 56 remote from the cross leg 58 is provided with an apertured end wall 60 through which a threaded piston rod 62 is threadedly engaged. The inner end of the piston rod 62 is disposed within the cylinder defined by the leg 56 and includes a diametrically enlarged piston head portion 64. Accordingly, it may be seen that upon adjustment of the piston rod 62 that the piston 64 may be adjusted longitudinally of the cylinder defined by the leg 56.

A column of fluid 66 is disposed within the conduit 24 and substantially entirely fills the latter and the portion of the leg 26 not occupied by the piston 64. The column of fluid establishes a motion transmitting connection between the pistons 32 and 38 and accordingly, upon movement of the piston 32 toward its limit position defined by the end wall 30 movement of the piston 38 toward the check valve assembly 40 will be effected.

Fuel under pressure by any suitable means is supplied to the end of the cylinder 28 adjacent the check valve assembly 40 by means of the fluid line or fuel line 48. As the compression spring 42 returns the piston 38 toward the end of the cylinder 28 adjacent the conduit 24, the port in the wall of the cylinder 28 located at 50 through which the fluid line 48 opens into the cylinder 28 will be uncovered and fluid under pressure will be admitted into the portion of the cylinder 28 disposed between the piston 38 and the check valve assembly 40. Then, upon a growing increase in pressure in the upper portion of the cylinder 14 disposed above the piston 18 therein the piston 32 will be urged upwardly and to the left as viewed in FIGURE 1 moving the column of fluid 66 through the conduit 24 in order to effect movement of the piston 38 toward the check valve assembly 40 whereupon the portion of the fuel disposed in the end of the cylinder 28 between the piston 38 and the check valve assembly 40 will be injected into the cylinder 12 above the piston 16 therein. As the apertured end wall 30 defines a limit for movement of the piston 32 away from the abutment means 34, the only way the amount of fuel introduced into the cylinder 12 may be increased is by effecting greater movement of the piston 32 downwardly and to the right as viewed in FIGURE 1. This is accomplished by increasing the effective length of the column of fluid 66 within the conduit 24 by moving the piston 64 toward the cross leg 58. Then, the effective stroke of the piston 32 may be increased whereby a proportionate increase in stroke of the piston 38 is effected. Accordingly, it may be seen that the quantity of fuel injected into the cylinder 12 by means of the piston 38 in the end of the cylinder 28 remote from the end wall 36, which components comprise fuel pump means.

It may be seen from FIGURE 1 of the drawings that movement of the piston 32 not effected by the movement of the piston 18 during its compression stroke. The spring 42 is strong enough to hold the pistons 38 and 32 stationary until the piston 18 starts downward on the power stroke.

With attention now directed to FIGURE 2 of the drawings it will be seen that the length of the fluid column 66 has been increased to its maximum by movement of the piston 64 in the leg 56 toward the leg 58. When this condition exists, a high increase in pressure within the cylinder 14 will inject a maximum amount of fuel into the cylinder 12.

It will be noted that the piston 38 will always be returned to its rest position against the apertured end wall 36 by means of the compression spring 42. Accordingly, if the effective length of the column of fluid 66 is reduced, although the piston 38 may be disposed in its limit position in engagement with the apertured end wall 36, instead of the piston 32 being positioned at A as in FIGURE 2 of the drawings, it will be positioned at B. Accordingly, it may therefore be seen that when the effective length of the column of fluid 66 is reduced, the length of travel of the piston 32 in the cylinder 26 will be reduced, and travel of the piston 32 in the cylinder 26 will be reduced. Accordingly, as the distance between B and the apertured end wall 30 is less than the distance between A and the end wall 30, movement of the piston 32 to its limit position defined by the apertured end wall 30 when the piston 64 is retracted away from the leg 58 of the T-fitting 54 will effect less movement of the piston 38 and accordingly less fuel will be injected into the cylinder 12.

It is to be noted from FIGURE 1 of the drawings that each of the cylinders 12 and 14 may be utilized, upon an increase of pressure within the combustion chambers 68 and 70, respectively, to inject fuel into the other cylinder. Such a mechanical connection could include cams drivingly connected to the crankshaft (not shown) of the engine 10.

Further, the column of fluid could be increased in effective length beyond that illustrated in FIGURE 2 by moving the piston 64 still further downward. This would enable the piston 32 to act as the limit stop for movement of the liquid column of fluid beyond that illustrated in FIGURE 2, the amount of fuel injected by the piston 38 would be reduced. Therefore, it may be seen that increasing the effective length of the liquid column can either increase or decrease the fuel injected and that either the engagement of the piston 38 with the wall 36 or the engagement of the piston 32 with the abutment means 34 may be utilized as a limit stop for movement of the pistons 32 and 38 to the left as viewed in FIGURE 2.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an internal combustion engine including a pair of combustion chambers, a fuel injection apparatus comprising conduit means, a pair of pressure chamber means communicated with the opposite end portions of said conduit means, movable pressure responsive driving partition means disposed in one of said chamber means and movable pressure responsive driven pumping partition means disposed in the other of said chamber means defining a pumping chamber therein on the side of the pumping partition means remote from said conduit means, a column of relatively incompressible fluid disposed in said conduit means establishing a motion transmitting connection between said driving and driven partition means, means communicating said pumping chamber with one of said combustion chambers and a fuel inlet, means communicating the other pressure chamber means, on the side of the corresponding partition means remote from said fluid column, with the other of said combustion chambers.

2. The combination of claim 1 including means limiting movement of said driving partition means toward said column.

3. The combination of claim 2 including means yieldingly urging said driven partition means in a direction effecting movement of said driving partition means away from said column.

4. The combination of claim 3 including means for varying the effective length of said column of fluid.

References Cited in the file of this patent

UNITED STATES PATENTS

| 1,314,561 | Wright | Sept. 2, 1919 |
| 2,260,268 | Warren et al. | Oct. 21, 1941 |
| 2,763,249 | Flynn | Sept. 18, 1956 |

FOREIGN PATENTS

| 573,596 | France | Mar. 13, 1924 |